US007730598B2

(12) United States Patent
Kurtz

(10) Patent No.: US 7,730,598 B2
(45) Date of Patent: Jun. 8, 2010

(54) AIR LINE DISCONNECT TOOLS

(75) Inventor: Scotty R. Kurtz, Clarinda, IA (US)

(73) Assignee: Lisle Corporation, Clarinda, IA (US)

( * ) Notice: Subject to any disclaimer, the term of this patent is extended or adjusted under 35 U.S.C. 154(b) by 102 days.

(21) Appl. No.: 11/962,192

(22) Filed: Dec. 21, 2007

(65) Prior Publication Data

US 2009/0160180 A1 Jun. 25, 2009

(51) Int. Cl.
*B23P 17/00* (2006.01)

(52) U.S. Cl. ............................ 29/237; 29/270; 254/25; 254/21

(58) Field of Classification Search .................. 29/237, 29/235, 263, 270; 254/25, 21
See application file for complete search history.

(56) References Cited

U.S. PATENT DOCUMENTS 598,306 A * 2/1898 Hendersen .................. 254/25
1,043,369 A * 11/1912 Smith .......................... 254/25
1,101,845 A * 6/1914 Graue .......................... 254/25
3,587,121 A * 6/1971 Morrow .......................... 7/166
5,909,910 A * 6/1999 Shaffer .................... 29/243.56
6,308,390 B1 * 10/2001 Sullivan ...................... 29/275
6,901,621 B2 * 6/2005 Bruneau ........................ 7/166
7,178,878 B2 * 2/2007 Rompel ...................... 299/100
7,438,279 B2 * 10/2008 Eby et al. ..................... 254/25
2009/0160180 A1 * 6/2009 Kurtz .......................... 285/39

OTHER PUBLICATIONS

Invention Disclosure Agreement No. 03-469 dated Oct. 18, 2003 from Gerald A. Wallace for a tool for releasing air lines on push in fittings on trucks and trailers.

* cited by examiner

*Primary Examiner*—Lee D Wilson
(74) *Attorney, Agent, or Firm*—Banner & Witcoff, Ltd

(57) ABSTRACT

A conduit disconnect tool is fabricated from a hollow tubular member having one end angled with respect to the longitudinal axis of the hollow tubular member and formed with a fork configuration at that end. The opposite end of the tool is milled to provide a semi-cylindrical section. Either end may be impinged on a fitting release plate to effect and permit removal of conduit from the fitting.

1 Claim, 3 Drawing Sheets

AIR LINE DISCONNECT TOOLS

BACKGROUND OF THE INVENTION

In a principal aspect the present invention relates to tools useful for disconnection of an air line or other conduit from a connector or fitting.

Many machines and mechanical control devices are operated by air or other fluids. Additionally, there are numerous instances wherein fluids other than air are carried by conduits between various ports in a mechanical mechanism. For example, pneumatic control systems or vehicle fuel lines often utilize flexible tubing to connect logic devices or controls or other elements. Typically, conduit connections between various components of mechanical devices are effected by means of a connector or fitting which includes a cylindrical opening for receipt of a conduit or tube. The connector includes an annular plate or similar structure which may be compressed or engaged to operate a tube retention mechanism incorporated in the connector or fitting. Thus pressing on the plate and moving it axially with respect to the conduit axis will effect a release of the conduit retained by the fitting. Release of the plate, of course, enables the fitting to typically spring back or return to a position that engages or compresses the conduit and retains it attached to the fitting.

When repairing mechanical devices which include conduit connecting various elements of the device, it is often necessary to replace component parts or the conduit. As a result, it is generally necessary to disconnect the tubular conduits joining various mechanical components. Such tubular connections may comprise plastic tubing, metal tubing, or the like.

Often a screwdriver is used to effect such disconnection. That is, the screwdriver blade may be impinged against the fitting retention plate which is moveable in the fitting to thereby release the conduit from the fitting. However, connections are often dirty or contaminated by debris or located in areas that are difficult to access. Thus, there has developed a need for a tool which will enable rapid disconnection of conduit, such as air lines, from fittings. Preferably, a universal tool or set of tools is desired in order to enable disconnection of conduit having various diameters from associated fittings. Such needs have led to the development of the tool of the present invention as well as sets of such tools for disengaging or disconnecting conduit from fittings.

SUMMARY OF THE INVENTION

Briefly, the present invention comprises a tool formed from a hollow tubular member having a first end which is compressed or formed into a first, flat end section. The flat end section is formed with a fork or U-shaped end prong. The first end with the forked end prong is angled with respect to the remaining, straight section of the hollow tube. Typically, the angle is in the range of about 45°±15°. The opposite or second end of the tool or tube is cut away to form a semi-cylindrical section.

Either end of the tool may be fitted about a conduit and then compressed against a fitting release plate that retains the conduit. Thus, each end of the tool is designed to engage a fitting and enable placement of force on the fitting to release conduit held by the fitting. The semi-cylindrical end of the tool may be located in any number of desired orientations on the tool; however, the embodiment of the invention disclosed positions the open side of the semi-cylindrical end disposed opposite the direction of the projecting prong.

Typically, a set of such tools is provided wherein the nominal diameter of the tubular member forming the tool slightly exceeds the outside diameter of the conduit which is to be disengaged from a fitting by means of the tool. Thus, a set of tools may be provided to enable removal of conduit having multiple sizes from their associated fittings, though a large diameter version of the tool may be utilized with multiple smaller sizes of conduit.

Thus, it is an object of the invention to provide an improved tubular conduit disconnect tool.

A further object of the invention is to provide a tubular disconnect tool formed from a hollow tube wherein the hollow tube may be fabricated from metal or other rigid materials.

Another object of the invention is to provide a disconnect tool which includes a disconnect feature or mechanism associated with each of the opposite ends of the tool and wherein the disconnect feature at the opposite ends is characterized by being sized to facilitate removal of substantially identical diameter conduit from a fitting.

Another object of the invention is to provide a disconnect tool as well as a set of disconnect tools which is inexpensive, rugged, easy to use and useful in highly inaccessible locations.

These and other objects, advantages, functions and features of the invention will be set forth in the detailed description which follows.

BRIEF DESCRIPTION OF THE DRAWING

In the detailed description which follows, reference will be made to the drawing comprised of the following figures.

DESCRIPTION OF EMBODIMENTS OF THE INVENTION

Figure 1:
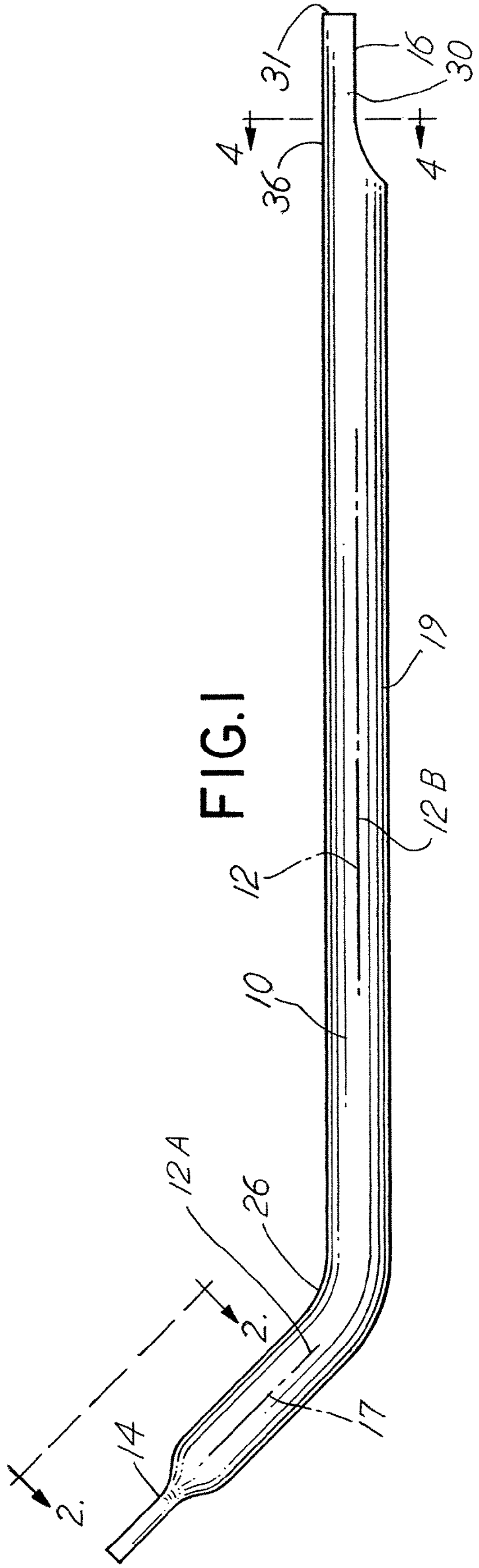
FIG. 1 is a side profile view of an embodiment of the tool of the invention.
Figure 4:
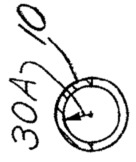
FIG. 4 is a cross sectional view taken along the line 4-4 in FIG. 1.
Figure 3:
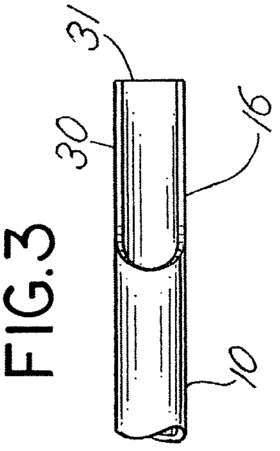
FIG. 3 is an enlarged view of the end of the tool of FIG. 1 opposite the end depicted in FIG. 2 and as viewed from the underside of the tool depicted in FIG. 1.
Figure 2:
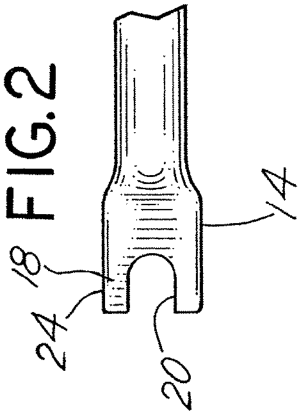
FIG. 2 is a plan view of the tool of FIG. 1 taken along the view line 2-2.
Figure 5:
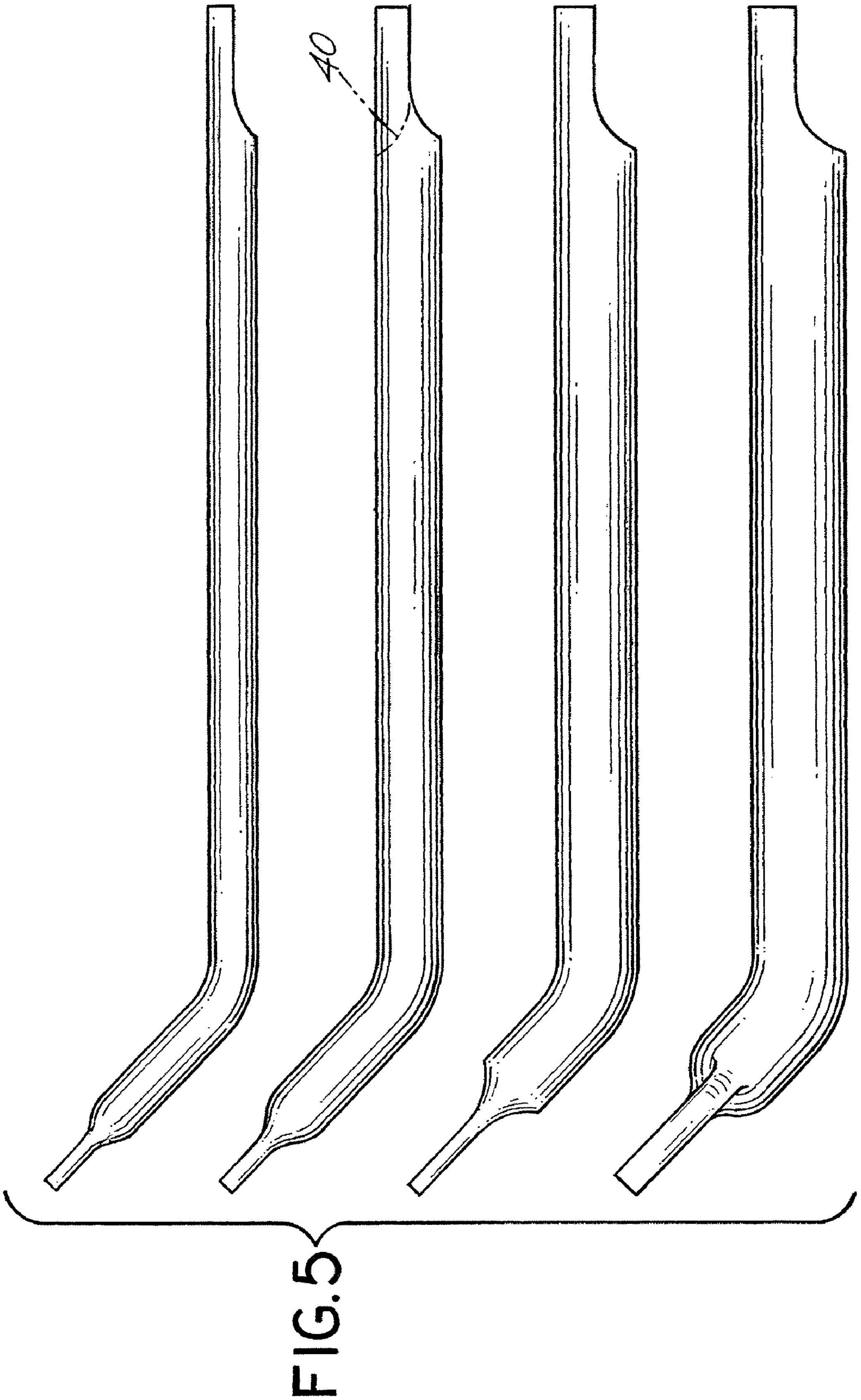
FIG. 5 is a side profile view of a set of tools similar to the tool of FIG. 1.

Referring to the figures, and in particular FIGS. 1-4, a typical tool, from a set of tools as shown in FIG. 5, is comprised of a hollow, tubular member 10 having a generally uniform diameter and extending axially along a longitudinal axis 12 between a first end 14 and a second end or opposite end 16. The tubular member 10 may be fabricated from metal or a plastic material. A preferred material is steel tubing having a black oxide protective coating.

The tubing extends longitudinally and terminates at the first end 14 with a fork shaped terminus or prong 18. The fork prong 18 is formed by compressing or flattening the opposite sides of the tube 10 to form a flat plate element with a center portion 20 cut away to define first and second spaced tines 22 and 24. The tines 22, 24 are spaced one from the other by a distance just slightly greater than the outside diameter of conduit to be engaged by the tool with a fitting or connector.

Thus, the forked prong 18 is designed to fit around and over both flexible conduit or non-flexible conduit gripped in a fitting or connector so that the tines 22 and 24 may be engaged against an axially moveable release plate of a fitting to compress the plate and thereby release conduit held by the fitting.

The fork section or prong 18 is generally coaxial with an angled extension 17 of the tubular member 10. The extension 17 is thus angled with respect to a linear section 19 having the center line axis 12 by virtue of bending of the tube 10 at bend 26. The angle of the bend 26 between the extension 17 and linear section 19 is in the range of 45°±15°. However, other angles may be adopted without departing from the spirit and scope of the invention. An angled extension 17 is preferred. The angled extension 17 extends longitudinally in the range of 1-3 inches from the linear section 19 which linear section 19 is typically about 2-5 times greater in length than the angled extension 17.

The axis 12 by virtue of the bend 26, is comprised of first and second linear components 12A and 12B. The first and second axial components 12A and 12B define a plane. The prong 18 formed by flattening the tube 10 at the first end 14 also defines a plane which, in a preferred embodiment, is transverse or normal to the plane defined by intersecting axial components 12A and 12B. As a consequence, the tines 22, 24 lie in the plane defined by the prong 18 and are thus oriented to facilitate manipulation of the tool in what is considered a highly efficient manner.

The tube or tubular member 10 further includes a second end 16 at the distal end of section 19 having a cut away portion or section to define a generally semi-cylindrical arcuate end 30 which is smoothly joined to the tube or tubular section 19. The axial extent of the cut or semi-cylindrical portion 30 is in the range of 1 to 3 inches in a typical embodiment of the tool. The second end 16 may be formed by milling and is milled so that the tube will open in the opposite direction from the direction of extension 17 of the first end 14. The milled end 16, and, more particularly, the remaining semi-cylindrical portion 30, thus is arranged along the top surface 36. However, as illustrated in phantom in FIG. 5, the milled end 16 may be reversed as, for example, along the phantom line 40 in FIG. 5. Further, the open side of the second or milled end 16 may be oriented in any desired direction. The orientation depicted is, however, deemed to be preferred to facilitate functionality of the tool.

Specifically, the open side of the milled end 16 has a medial radius 30A in FIG. 4 which lies normal to the plane defined by axial components 12A and 12B. The second end 16 includes a terminal face 31 transverse to axis 12, but the face 31 may be angled slightly with respect to axis 12 about ±20°.

FIG. 5 depicts a set of distinctly sized disconnect tools, each of which is adapted to be cooperative with a particular diameter of conduit or tubing. Thus, the opening 20 in the fork section 18 or between tines 22, 24 is generally slightly greater than the external diameter of the tubing fitted in a conduit fitting. Also, the general diameter of the tubular member 10 is such that it is slightly greater than the diameter of the conduit which is to be disengaged by the tool.

Figure 6:
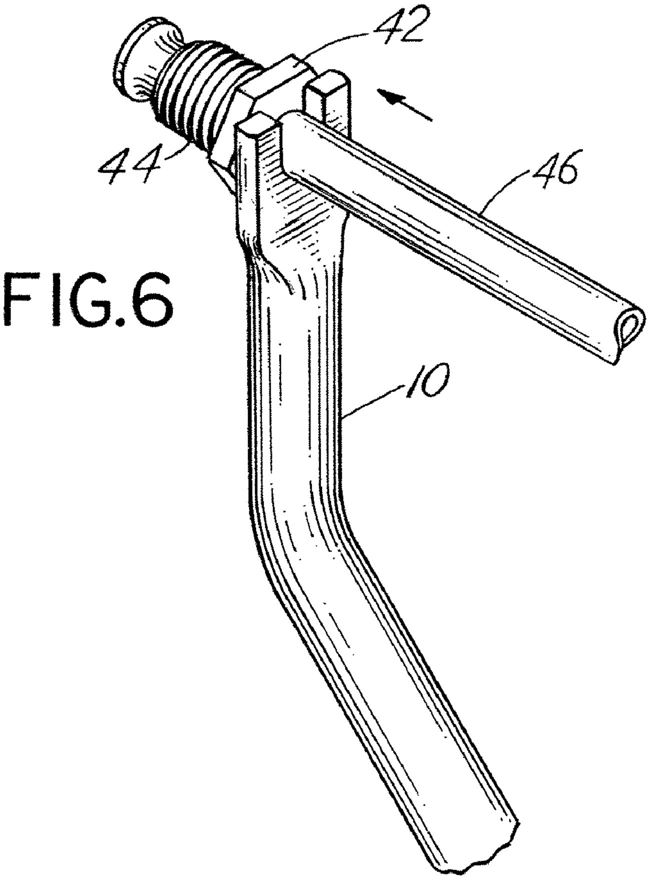
FIG. 6 is an isometric view illustrating the use of the tool and, more particularly, the use of the tool having a first end engaged with the release plate of a fitting.
Figure 7:
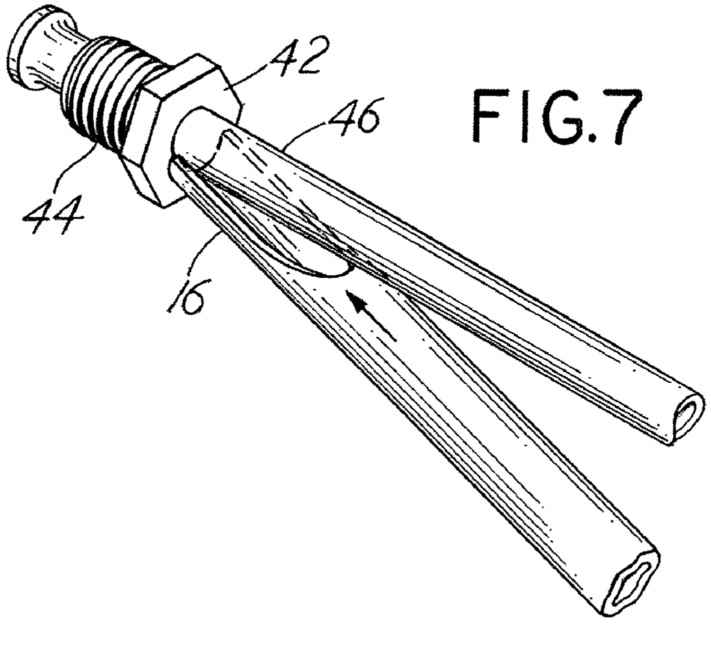
FIG. 7 is an isometric view of a tool depicting the manner of use thereof for release of a conduit using the opposite end of the tool as depicted in FIG. 3.

FIGS. 6 and 7 illustrate the manner of use of the tool. As shown in FIG. 6, the forked prong 18 may be compressed against a collar or plate 42 of a fitting 44. The plate 42 (typically annular) may then be driven in the direction of the arrow in FIG. 6 to effect release of conduit 46. Reversal of the operation may be effected to insert conduit 46 by pushing or inserting conduit 46, though in most instances, the practice of reinsertion may be easily effected without the use of the tool.

FIG. 7 illustrates an alternative manner for engaging a plate 42 of fitting 44 by engagement with the second or milled end 16 of the tool. The milled end 16 thus fits around the conduit 46 and may be manipulated in the direction of the arrow to impinge surface 31 against the plate 42 to effect movement of the plate and release of the conduit 46.

Variations of the design of the tool and a set of tools may be effected without departing from the spirit and scope of the invention. For example, the fork or tines which are coaxial with the center line 12A of tubular member 10 may be angled or aligned with one surface or the other surface of the tubular member 10. The opening in the second end 16 may be oriented in any radial position from the axis 12. The angle of the first end 14 may be adjusted depending upon the needs and intended use of the tool. Additional bends may be included in tube 10 between the ends 14, 16 for example to facilitate gripping the tool. Thus, while there has been set forth a preferred embodiment of the invention, it is to be understood that the invention is limited only by the following claims and equivalents thereof.

What is claimed is:

1. A tool for effecting release of conduit from a fitting having a release collar, said conduit fitted through the collar, said collar moveable longitudinally to enable disengagement of said conduit from said fitting, said tool comprising:

a generally hollow, generally cylindrical tube having a longitudinal axis, an internal tube diameter greater than the outer diameter of a said conduit engaged with a said fitting, and an external tube diameter, said tube further including a first end section for fitting over the conduit and engaging the said fitting and an opposite, second end section, said tube first end section flattened and formed with first and second spaced tines, said first and second spaced tines defining a passage therebetween greater than the diameter of the said conduit, said tines extending in the direction of the longitudinal axis and said hollow tube second end section formed as a generally semi-cylindrical longitudinal section of said tube with a second tube end surface generally transverse to the longitudinal axis, said tube further including a single bend in the tube in the range of 45±15° intermediate the first end section and second end section;

wherein the hollow tube at the first end section is flattened to form said spaced tines and said passage therebetween, said passage open at the distal end of said first end section; and said tube further including first and second intersecting center line axial elements that intersect at said bend and lie in a first plane, with said flat tines in a second plane substantially transverse to the first plane.

* * * * *